Nov. 1, 1966 W. H. RASMUSSEN ETAL Re. 26,107

EASY OPENING CONTAINER

Original Filed Jan. 3, 1963

INVENTORS

WALTER H. RASMUSSEN

RONALD V. JOHNSON

BY Robertson Dunning

ATTORNEY

United States Patent Office

Re. 26,107
Reissued Nov. 1, 1966

26,107
EASY OPENING CONTAINER

Walter H. Rasmussen, St. Paul, and Ronald V. Johnson, Minneapolis, Minn., assignors to Waldorf Paper Products Company, St. Paul, Minn., a corporation of Minnesota Original No. 3,141,598, dated July 21, 1964, Ser. No. 249,178, Jan. 3, 1963. Application for reissue Sept. 13, 1965, Ser. No. 493,606
7 Claims. (Cl. 229—51)

Matter enclosed in heavy brackets [ ] appears in the original patent but forms no part of this reissue specification; matter printed in italics indicates the additions made by reissue.

This invention relates to an improvement in easy opening container and deals particularly with a container structure capable of being effectively sealed during shipment and transportation, and which may be opened with comparative ease.

When a container is used for containing relatively heavy material, such as canned goods or bottled goods for example, it is necessary that the flaps be securely sealed during transportation and shipment. This is perhaps most commonly accomplished by gluing the flaps in superimposed relation. For many years it has been recognized that tightly sealed containers are difficult to open by the consumer. Knives have been produced for opening the containers, but care must be taken with implements of this type to prevent cutting or marring the goods contained. For example, if the containers are used for cartons of products, difficulty is sometimes experienced in cutting open the containers without cutting the cartons inside. As a result, various means have been provided for simplifying the opening of the cartons. The present structure comprises an improved structure of this type.

An object of the present invention resides in providing an easy opening container which can be produced at little or no added cost and which is extremely effective in use. This is accomplished by providing a pair of tear strips extending across the main closing flaps which may be used to rip away a strip of the two flaps inwardly of the free ends thereof. These main flaps are provided with a pair of cut lines or weakened lines of separation which extend from the tear strips to the free ends of the flaps. The portions of the main flaps between the tear strips and the free ends thereof may then be solidly adhered to the closing flaps of the end walls, thus forming an effective seal. However, when the tear strips have been removed, the end flaps may be folded up to open the container to provide access to the container contents.

A feature of the present invention resides in the fact that virtually any desired area of adhesive may be provided by varying the position of the tear strips. By providing these strips near the fold lines connecting the closing flaps to the side walls of the container, a greater area of adhesion may be provided. However, by [removing] *moving* the tear strips outwardly toward the free ends of the side wall closing flaps, smaller areas of adhesive are provided, but the cut lines in the ends of the flaps may be materially shorter.

These and other objects and novel features of the present invention will be more clearly and fully set forth in the following specification and claims.

In the drawings forming a part of the specification,

Figure 1:
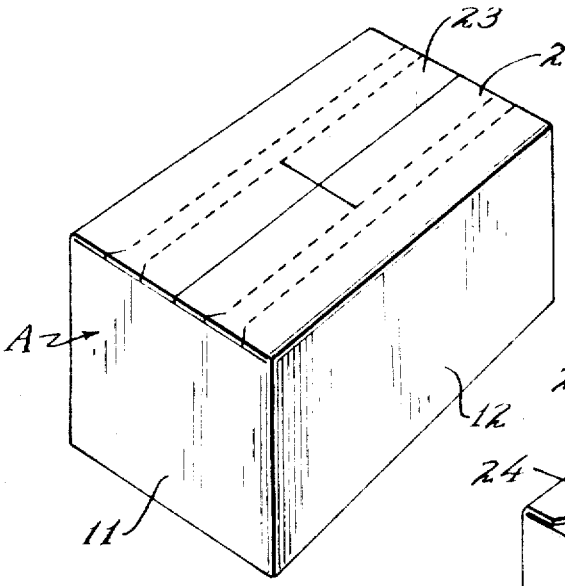
FIGURE 1 is a perspective view of the closed container showing the general arrangements of parts therein.

The container is illustrated in general by the letter A. As is indicated in the drawings, the blank includes a side wall panel 10, an end wall panel 11, a side wall panel 12, and an end wall panel 13 connected together along parallel fold lines 14, 15, and 16. In producing the container, the end panels 10 and 13 of the series are taped or otherwise secured together so as to form a tubular wall structure. If preferred, a glue flap or stitch flap may be provided on one end panel to overlap and be secured in face contact with the other end wall panel thereof.

Bottom closing flaps are connected to the lower edges of the panels along a fold line 17, these closing flaps on the panels 10, 11, 12, and 13 are being illustrated at 19, 20, 21, and 22, respectively. Top closing flaps 23, 24, 25, and 26 are hingedly connected to the upper edges of the panels 10, 11, 12, and 13 along a fold line 27. The bottom closure is shown of conventional form, while the flaps forming the upper closure are specially produced to provide the easy opening feature of the container.

Removable tear strips 29, 30, 31, and 32 extend in alignment across the closing flaps 23, 24, 25, and 26. These tear strips are preferably of the type illustrated in the Guyer Patent 2,706,076 in which the inner liner of the corrugated board is slit at right angles to the intermediate corrugations along parallel side by side lines [of fold] 33 and 34 *forming weakened lines of separation*. Short cut lines 35 communicate with the [slits] *weakened lines* 33 and 34 in the closing flap 23, and similar cut lines 36 communicate with one end of the [slits] *weakened lines* 33 and 34 in the closing flap 25. The tear strips 30 and 32 in the end wall panels 24 and 26 serve no useful purpose in the present combination but it is easier to form substantially continuous slits in the inner liner than to provide slits of predetermined length, as the slits are usually cut into the liner before the liner is attached to the corrugated medium. Slits 37 and 39 extend into the free end of each of the flaps 23 and 25 extending from the free edge to the outer slit 33 in the inner liner. These slits 37 and 39 are preferably midway between the side edges of the flaps 23 and 25, but may be at any desired point in the flap ends, as long as they are spaced from the side edges of the flap a distance equal to the length of the end wall closing flaps 24 and 26.

In sealing the other end of the container A, adhesive is applied either to the central portions of the flaps 24 or 26 or to the under surface of the flaps 23 and 25, the area of adhesive engagement being limited to the area between the outermost [slit] *weakened line* 33 and the free ends of the closing flaps 23 and 25. This area is of sufficient size to provide an effective seal. At the same time, the tear strips and the portions of the closing flaps which are adjoining the fold lines connecting the side wall closing flaps to the side walls remain unadhered.

By varying the position of the [slits] *weakened lines* 33 and 34, the areas of the side wall closing flaps which may be sealed to the end wall closing flaps may be increased or decreased. By having these tear strips closely adjacent to the fold line 27 connecting the side wall closing flaps to the side walls, virtually the entire overlapping area of the flaps may be sealed. As the tear strips are moved outwardly, the effective length of the cut lines 37 and 39 must be accordingly increased. However, if desired, the cut lines 37 and 39 may terminate slightly short of the end edges of these flaps so as not to flex open during shipment.

Figure 2:
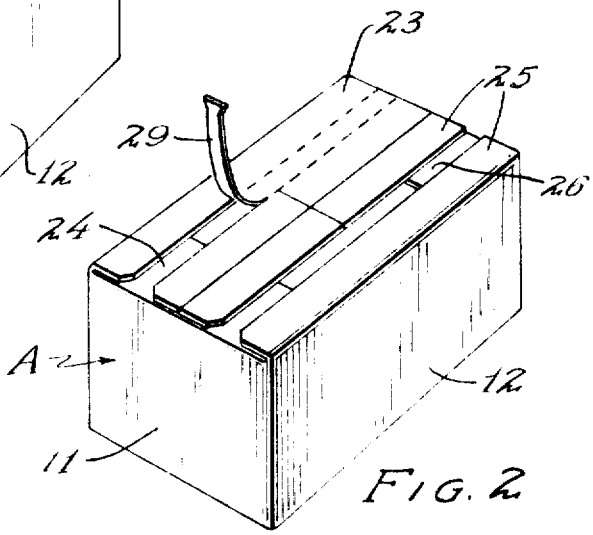
FIGURE 2 is a view similar to FIGURE 1 showing the partially opened container.
Figure 3:
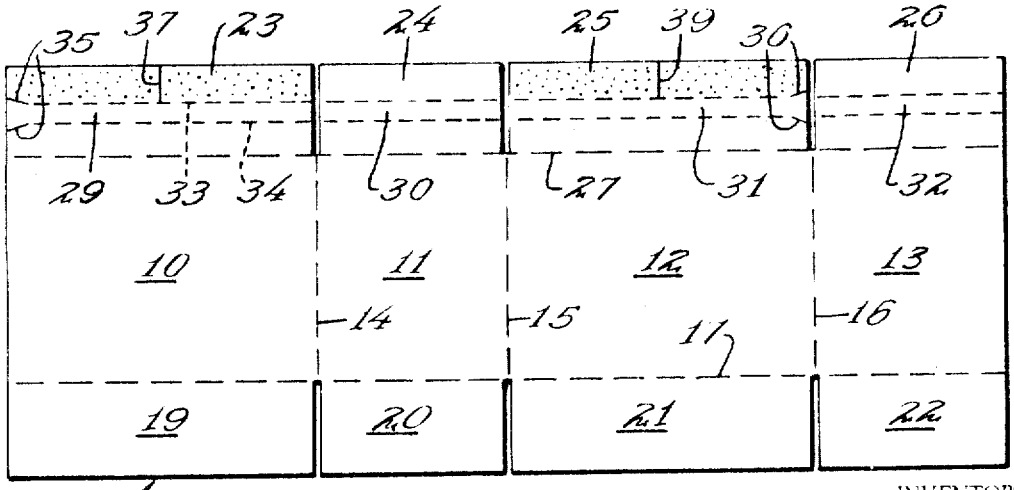
FIGURE 3 is a diagrammatic view of the blank from which the containers shown in FIGURES 1 and 2 are as produced.

With the container A sealed in the manner illustrated in FIGURE 1 of the drawings, it may be readily opened by grasping the ends of the tear strips 29 and 31 in the side wall closing flaps, the tear strip 29 being grasped between the cut lines 35, and the tear strip 31 being grasped between the cut lines 36. The tear strips are pulled upwardly in the manner illustrated in FIGURE 2 thus separating the unglued portions of the side wall closing flaps adjoining the fold line 27 from the portions of these flaps which are adhered to the end wall closing flaps 24 and 26. The outer portions of the side wall closing flaps which are the portions thereof adjoining the fold line 27 may be folded upwardly and the end wall closing flaps 24 and 26 may then be folded upwardly, the inner adjoining portions of the side wall closing flaps which are adhered thereto swinging upwardly therewith to disclose the container contents.

In accordance with the patent statutes, we have described the principles of construction and operation of our improvement in easy opening container, and while we have endeavored to set forth the best embodiment thereof, we desire to have it understood that changes may be made within the scope of the following claims without departing from the spirit of our invention.

We claim:

1. An easy opening container including, a rectangular tubular container including parallel relatively longer side walls and parallel relatively shorter end walls, closing flaps on said side and end walls, the closing flaps of the side walls extending substantially into end abutting relation when folded into a common plane, a removable tear strip extending across each side wall closing flap parallel to the lines of fold connecting these side wall closing flaps to said side walls, each said tear strip being formed by spaced side by side weakened lines of separation, and weakened lines of separation extending inwardly from the free ends of the side wall closing flaps to the tear strip.

2. The structure of claim 1 and in which said last named weakened lines of separation are spaced from the ends of said side wall closing flaps a distance at least equal to the length of said end wall closing flaps.

3. The structure of claim 1 and in which said last named weakened lines of separation comprise cut lines throughout at least the major portion of their length.

4. An easy opening container including, a rectangular tubular container including parallel relatively longer side walls and parallel relatively shorter end walls, closing flaps on said side and end walls, the closing flaps of the side walls extending substantially into end abutting relation when folded into a common plane, a removable tear strip extending across each side wall closing flap parallel to the lines of fold connecting these side wall closing flaps to said side walls, each said tear strip being formed by spaced side by side weakened lines of separation, said tear strips being spaced inwardly from the free ends of said side wall closing flaps a substantial distance to provide a substantial area of contact between said side wall closing flaps and said end wall closing flaps between said tear strips and the fre ends of said side wall closing flaps, and cut lines extending at least the major portion of the distance from the free ends of the side wall closing flaps to said tear strips, said cut lines being spaced from the ends of said side wall closing flaps a distance at least equal to the length of said end wall closing flaps.

5. The structure of claim 4 and in which said cut lines are at generally right angles to the free ends of said side wall closing flaps.

6. The structure of claim 4 and in which adhesive is applied only between said substantial areas of contact.

*7. An easy opening container including:*

*a rectangular tubular container including a pair of parallel side walls and a pair of parallel end walls connected in tubular relation,*

*closing flaps on said side and end walls, the closing flaps of said side walls extending substantially into end abutting relation when folded into a common plane,*

*the closing flaps on one pair of walls being foldable in a common plane over the closing flaps on the other pair of walls,*

*a removable tear strip extending across each of the closing flaps on said one pair of walls parallel to the lines of fold connecting them to their respective walls,*

*weakened lines of separation extending inwardly from the free ends of said closing flaps on said one pair of walls to the tear strip.*

References Cited by the Examiner

The following references, cited by the Examiner, are of record in the patented file of this patent or the original patent.

UNITED STATES PATENTS

| | | | |
|---|---|---|---|
| 2,148,480 | 2/1939 | Larsh | 229—51 |
| 2,778,561 | 1/1957 | Brunaa | 229—51 |
| 2,864,547 | 12/1958 | Guyer | 229—51 |
| 3,022,931 | 2/1962 | Guyer | 229—51 |

JOSEPH R. LECLAIR, *Primary Examiner.*

D. T. MOORHEAD, *Assistant Examiner.*